No. 665,146. Patented Jan. 1, 1901.
W. & L. H. SWAIN.
INFLATABLE TIRE.
(Application filed Feb. 6, 1899.)
(No Model.)
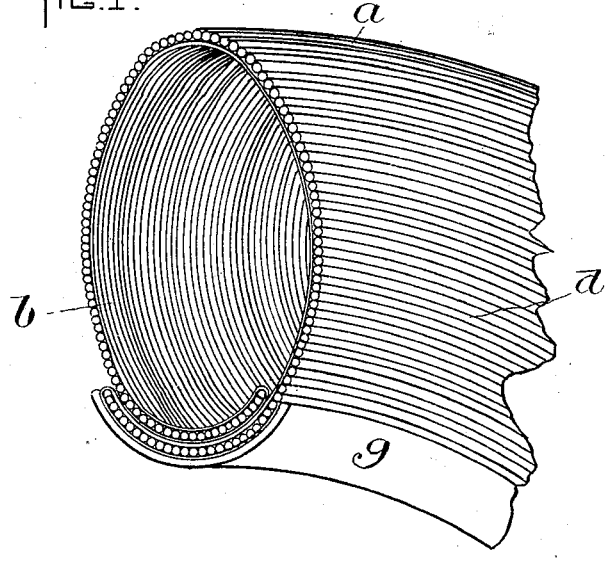
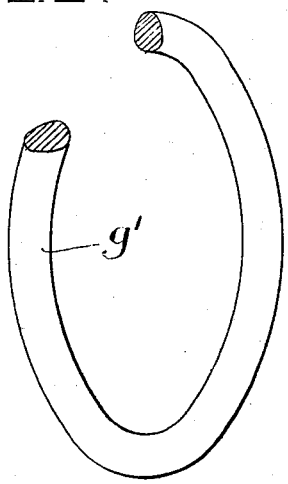
Witnesses
P. W. Pezzetti.
E. Batchelder
Inventors
Walter Swain
Leonard H. Swain
by Knight Brown & Quinby
Attys.

UNITED STATES PATENT OFFICE.

WALTER SWAIN AND LEONARD HARTLEY SWAIN, OF BOLTON, ENGLAND.

INFLATABLE TIRE.

SPECIFICATION forming part of Letters Patent No. 665,146, dated January 1, 1901.

Application filed February 6, 1899. Serial No. 704,639. (No model.)

*To all whom it may concern:*

Be it known that we, WALTER SWAIN and LEONARD HARTLEY SWAIN, subjects of the Queen of Great Britain, and residents of 177 Belmont road, Astley Bridge, Bolton, in the county of Lancaster, England, have invented a new and useful Improvement in Inflatable Tires for the Wheels of Road-Vehicles, of which the following description, together with the accompanying sheet of drawings, is a specification.

Our invention relates to the production of an inflatable tire; and it consists in following such a method of construction of the canvas part thereof that when the tire is finished on being inflated it will assume a specific and desired shape in cross-section, so that it may be produced in varied shapes to suit the varied requirements for which tires have to be used— as in the case of racing, traveling on roads or highways, &c., and this object we attain as hereinafter described and as illustrated by the accompanying sheet of drawings, wherein—

Figure 1 is a sectional end elevation and part perspective of the canvas part of a tire produced in accordance with our invention. Fig. 2 is a perspective view of about half a tire's cover, the same being drawn to a reduced scale. Fig. 3 is a sectional view of a part hereinafter described, the same being drawn to a greatly-reduced scale.

In carrying our invention into effect we place the weft-threads $b$ crosswise of an annular shaping piece or mandrel, (of a form hereinafter described,) cover said threads with rubber solution or other adhesive substance, and then place over them the warp-threads $d$, by which means and by the shaping-piece being of the desired form as the warp-threads $d$ approach the edges $c$ of the tire they will occupy circles of less diameter than those approaching the periphery $a$. Consequently when the canvas thus produced is covered by the outer covering of india-rubber in the well-known manner and placed upon a rim, as at $g$, on the inflation of the tire the circumferential strains are withstood by the several threads $d$ and the lateral strains are withstood by the cross-threads $b$, and since those of the threads $d$ which have such a length as to bring them within the rim $g$ cannot be withdrawn or forced from said rim by either the radial or lateral pressures it follows that according to the varied lengths of the others of such threads $d$ from the point $c$ to that at $a$, as held laterally by the cross-threads $b$, so will be the shape of the cover or tire.

To enable the circumferential threads $d$ to maintain the positions in which they are wound upon the cross-threads, we cover said threads $d$ with rubber solution or other adhesive substance prior to or at the time they are being wound thereon.

It will be seen that we may place the cross-threads $b$ over or on the outside of the threads $d$ instead of winding these latter upon them; but we preferably follow the method first before described.

In producing the fabric described we may employ an annular shaping-piece $g'$, a sectional piece of which is shown by Fig. 3, in which case the threads $d$ are coiled or wound continuously around it to produce an entire and endless piece of canvas, or we may make each separate thread $d$ of the desired length and then fold or wrap their respective ends over each other to form the canvas endless, fixing or securing the ends thus folded by means of rubber solution or other adhesive substance.

It will readily be seen that the threads $b$ may either be at right angles or any other angles, to the threads $d$, as may be found advantageous, and that these threads $b$ may be either in single layers or in more than one such layer, as circumstances may require.

It will now be understood that the construction of the tire includes parallel threads $d$, extending circumferentially around the tire, and cross-threads $b$, which are in contact with the circumferential threads, all of the threads of each layer being secured together and the two layers of threads being secured together by a flexible air and water proof substance. There is no tube of rubber or other material intervening between the inner and outer layers, and therefore the rubber solution or other adhesive substance cements the two layers together and prevents any possibility of the threads of one layer moving relatively to the other to such an extent as to produce any wearing action of one upon the other in use. In addition the cementing of the two series of layers fixes the position of the threads relatively in such close relation as to form a substantially unitary structure, the threads of which retain their relative positions under all circumstances. Although Fig. 1 shows the tire or cover as being inflated without employing an inner inflating-tube, it will be understood that we can use such whenever found desirable.

Having now particularly described and ascertained the nature of our said invention and in what manner the same is to be performed, we declare that what we claim is—

A tire for the wheel of a road-vehicle comprising a series of parallel threads extending circumferentially around the tire, and a series of cross-threads in contact with the circumferential threads, one series being laid entirely outside of the other, the circumferential threads and the cross-threads being secured together and to each other by a flexible air and water proof substance to form a subtantially unitary structure.

WALTER SWAIN.
LEONARD HARTLEY SWAIN.

Witnesses:
SAMUEL HEY,
DAN DUTTON.